Patented Oct. 24, 1939

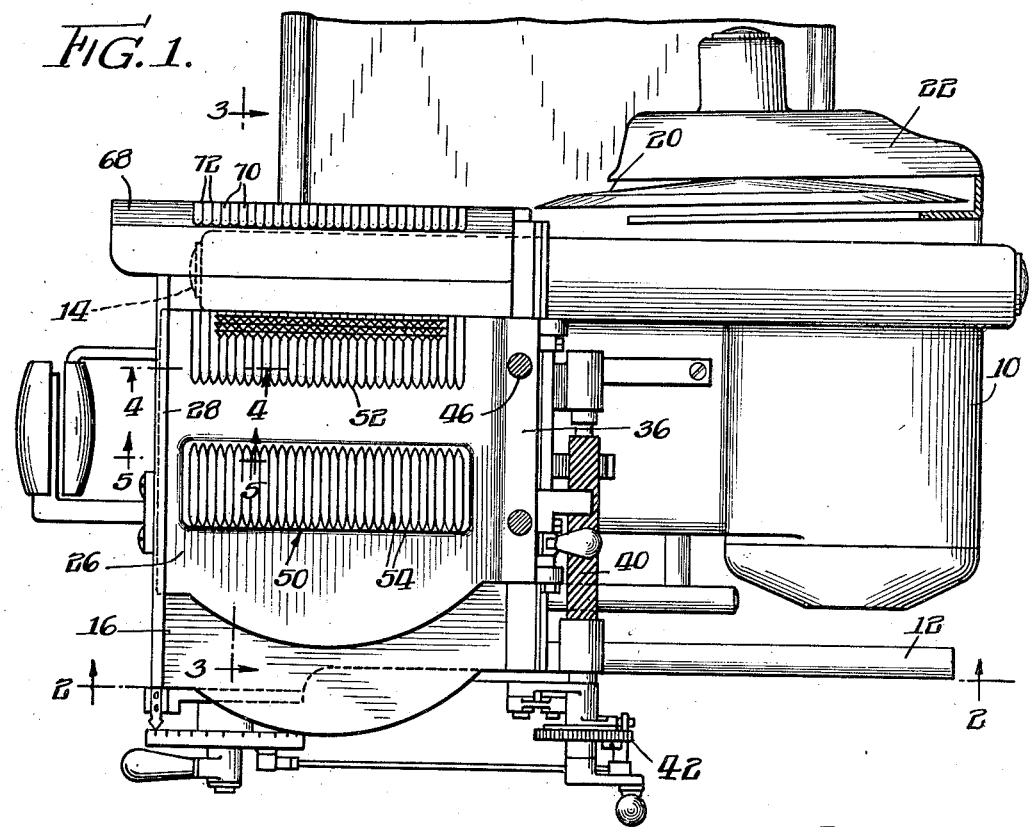

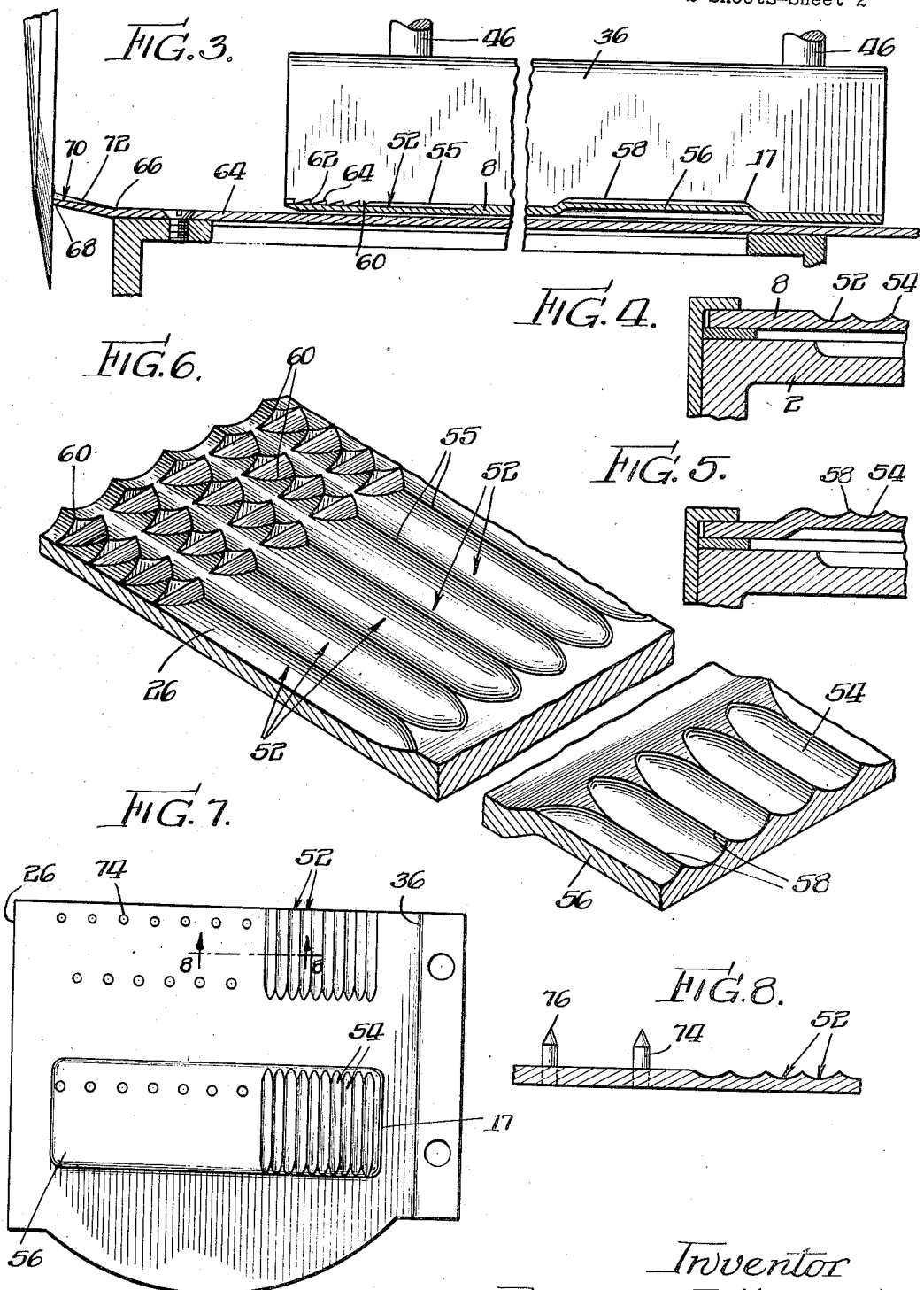

2,177,526

UNITED STATES PATENT OFFICE 2,177,526

SUBSTANCE SUPPORT FOR SLICING MACHINES

Richard J. Heuer, Philadelphia, Pa., assignor to U. S. Slicing Machine Company, La Porte, Ind., a corporation of Indiana Application April 15, 1937, Serial No. 137,078

12 Claims. (Cl. 146—102)

This invention relates to a slicing machine and more particularly to means for supporting substance or food upon said machine and for feeding it to a slicing knife.

An object of this invention is to provide a substance support and carriage mounted upon a slicing machine which will maintain substance in proper position for the production of uniform slices and free from displacement in any direction such as would produce irregular or deformed slices.

A further object of this invention is to provide a substance support or food table and carriage which will prevent shifting of the substance by the drag or friction of the knife and which will maintain this function even though the substance be relatively plastic, pliable or soft.

Yet another object of this invention is to provide a food table for supporting substance in an inclined position, said table having means on its surface to effectively resist the tendency for displacement of the substance downwardly of said incline when clamped against or situated on the food table.

Still another object of this invention consists in the provision of corrugations of varying height on the food table, together with a further series of corrugations or grooves formed transversely thereof to cause firm holding of the substance in all directions on the surface of the plate.

An additional object of this invention is the provision of a feed plate having a portion of its transverse area provided with inclined substance supporting means and upstanding prongs, the remainder being free from any prongs or the like whereby to permit selective positioning of substance in accordance with the desire of the operator or the particular characteristics of the substance being sliced.

Numerous other objects and advantages will more fully appear during the course and progress of the following specification.

Fig. 1 is a top plan view of an improved slicing machine embodying the invention.

Fig. 2 is a sectional elevation taken on the line 2—2 in Fig. 1.

Fig. 3 is a vertical sectional elevation taken on the line 3—3 in Fig. 1.

Fig. 4 is a fragmentary vertical sectional elevation taken on the line 4—4 in Fig. 1.

Fig. 5 is a vertical fragmentary elevation taken on the line 5—5 in Fig. 1.

Fig. 6 is a fragmentary perspective detail view of the substance plate employed in accordance with the present invention.

Fig. 7 is a top plan view of an alternative preferred form of substance supporting plate.

Fig. 8 is a fragmentary vertical sectional elevation taken on the line 8—8 in Fig. 7.

The particular slicing machine selected for illustrating the present invention comprises a base 10 having longitudinal side bars or rails 12 and 14 upon which there is mounted for fore and aft reciprocation a carriage 16. A motor 18 is housed within the base supporting structure 10, as shown in Fig. 2, and drives a stationary, but rotatably mounted, knife 20 which is operatively supported on a knife supporting bracket 22, Fig. 1. The knife 20 is driven by the motor 18 through a train or series of gears or pulleys and belts designated generally by the numeral 24 in Fig. 2.

The carriage 16 is adapted to be reciprocated forwardly and rearwardly in a rectilinear path parallel to the cutting edge of the knife, and a food table or substance support 26 mounted in suitable guide-ways 28 and 30, Figs. 1 and 2, is adapted to advance the substance transversely of the cutting plane of the knife so that slices may be cut from the substance during reciprocation of the carriage. The guide-way 28 comprises a channel-shaped opening into which the edge of the food support adjacent the operator is adapted to be received. The guide-way 30 comprises a rabbeted portion and an end plate 32 which is urged by springs 34 against the forward end of the carriage 16. The rearward edge of the food supporting table 26 is received in the guide-way 28 while a guide 36, provided on the forward edge of the food table 26, operates in the guide-way 30. The guide 36 comprises a casting or fitting having lugs formed on the bottom thereof which are adapted to abut a pin (not shown) arranged in the guide-way to limit the slidable movement of the substance supporting plate.

The present slicing machine is provided with a feed screw 40 for advancing the substance supporting table and with mechanism, generally indicated at 42, to periodically rotate said feed screw whereby to advance the table toward the plane of the knife. The specific details of all of these mechanisms, including means for permitting disengagement and removal of the substance supporting plate and the means for limiting the slidable movement of the substance supporting plate, are all disclosed and defined more in detail in Patent No. 2,136,792 of November 15, 1938, in the name of Joseph Folk. The present invention is disclosed as applied to the same type of machine as illustrated in the prior filed application. This present machine also includes a handle 44 for reciprocating the carriage forwardly and rearwardly in a rectilinear path parallel to the cutting plane of the knife. The handle is provided with a movable portion for the purpose of controlling operation of the machine and locking the carriage against inadvertent movement when not in use. Upstanding vertical rods 46 may be affixed to the guide 36 to support and guide a food clamp 48, Fig. 2, for engaging and clamping the substance therebetween.

In order to facilitate cutting of the proper slices, means are provided on the top surface of the feed table to engage the substance and cooperate with similar means located at the edge of the carriage adjacent the cutting plane of the knife. The upper surface of the food table 26 intermediate the ends thereof is provided with a plurality of corrugations 50 situated in two groups, namely, a group 52 closely adjacent the plane of the knife, and a second group of corrugations 54 removed therefrom. The corrugations 52, as shown more in detail in Figs. 4 and 6, are preferably formed as a series of parallel grooves or furrows in the top plane surface of the substance supporting plate, the said grooves extending generally perpendicular to the plane of the knife and terminating at the edge of the plate. The grooves thus form a series of parallel upstanding ridges 55 which engage the lower surface of substance placed thereon and tend to resist transverse displacement thereof.

The other group of corrugations 54 are formed in an area of the substance supporting plate 56 which is struck upwardly or raised from the normal plane of the substance supporting plate. The corrugations 54 are formed as grooves in the raised surface and extend generally parallel to the grooves 52 forming ridges 58 therebetween. If desired, the grooves or furrows of these corrugations may be relatively flush with the top surface of the food table but it has been found desirable to make these grooves with their bottoms slightly above the normal face of the food table 26. The ridges are preferably relatively sharp, as shown in the figures.

According to the preferred embodiment the ridges 55 and 58 are in alignment although it will be obvious from the above disclosure that they may be offset if desired. It is thus apparent that the ridges 58 are situated in a plane elevated vertically from the ridges 55, as a result of which substance placed on the supporting plate will tend to be tilted or inclined downwardly toward the plane of the knife.

In order to maintain the substance fixedly against displacement in the direction of the inclination, the ridges 55 adjacent the end of the plate 26 are provided with transverse grooves 60, Figs. 3 and 6, extending in alignment across the raised ridges 55. As shown more clearly in Fig. 3, the transverse grooves in the ridges preferably are provided with upstanding vertical faces 62 at the side adjacent the knife plane while having a gently inclining side away from said knife. Thus it will be apparent that these transverse grooves or serrations will exert a maximum resistance against displacement of the substance placed thereon in a direction toward the cutting plane.

The plate 64, forming the top surface of the carriage at a point close to the cutting plane of the knife and indicated by the numeral 66, Fig. 3, is bent and inclines upwardly, as indicated at 68. The portion 68 is provided on its upper surface with a plurality of corrugations 70 generally perpendicular to the knife plane and parallel to the aforementioned corrugations. The ridges 72 of the corrugations 70 are flush with the upper normal inclined surface of the plate while the grooves or furrows forming these corrugations are countersunk or extending below the normal upper face. So, too, the corrugations 70 increase in depth toward the plane of the knife. It will be apparent, therefore, that in operation substance is placed upon the substance supporting plate on the carriage with a portion extending beyond the end of the plate adjacent the knife.

The food clamp 48 is lowered on the rods 46 until it comes into contact with the upper surface of the substance to be cut and, after placing suitable pressure thereon, the clamp is rigidly positioned with respect to the supports 46. The substance on the food table will be slanted or inclined downwardly slightly toward the cutting plane of the knife and, when the substance supporting plate 26 and the substance is further fed, the overhanging end of the substance engages the corrugations 70. It will be apparent that, due to its inclination, the substance will be relatively forcefully engaged with the latter corrugations which will normally tend to urge the substance upwardly against the tension of the food clamp, thus relatively rigidly tensioning the substance immediately adjacent the knife and permitting a good, clean slice to be removed.

Due to what is in effect an inclination of the supporting surface of the food plate, there has been found a normal tendency for the substance to be displaced downwardly along the incline in the direction of the corrugations. This disadvantage, however, is effectively resisted by the grooves 60, and particularly by the vertical faces 62.

In an alternative preferred form of the invention shown in Figs. 7 and 8, the substance supporting plate 26 is provided with a struck-up or raised portion 56 as before, and grooves or corrugations 52 and 54 are provided in the upper surface in the manner as aforementioned. However, instead of providing these corrugations over substantially the entire transverse width of the plate, they are merely situated over a portion thereof adjacent the forward side of said plate, as indicated in Fig. 7. The remainder of the transverse width is provided with a plurality of upstanding barbs or prongs 74 protruding above the upper surface of the plate and having relatively sharp upper points 76. As shown in the figures sharpened prongs may be placed on the struck-up or raised portion of the plate as well as the normal surface thereof although the former group may be omitted if desired.

It will be apparent, therefore, that, if the substance being sliced is placed toward the forward side of the supporting plate, it will rest upon the corrugations 52 and 54. Alternatively it may be situated over the prong portions of the plate in accordance with the will of the operator or the particular substance being treated. For instance, when it is desired to slice meats of certain types which may be pierced, then the article is initially situated over the pronged area of the plate and the meat clamp pressed down thereover in readiness for feeding to the knife. On the other hand, when it is desired to slice an article such as cheese which is relatively firm and in which the holes made by the prongs 74 would be a detriment, then the substance is placed in the alternative position over the corrugations. The area taken up by the corrugations 52 and 54 is selected such that it will accommodate conventionally shaped cheeses and other articles which are not to be pierced. While the alternative embodiment is shown as comprising a pronged area, nevertheless this area may be situated by the corrugated and transversely grooved areas as shown in the prior preferred embodiment. Thus, for instance, substantially the entire transverse width of the substance supporting plate would be provided with corrugations 52 and 54 but only a portion of the width of the corrugations 52 would be provided with grooves 60 whereby a substance could be situated either on the pronged or unpronged section as desired.

It is highly important in the present art to present a substance being cut properly to the knife, particularly when the substance is characterized by some degree of toughness and resiliency. This is due to the fact that the knife being pushed against the substance with some force will tend to distort it out of normal shape and to produce the cut while the body of substance is characterized by abnormal strains. As a result the plane of the cut tends to vary from the true cutting plane of the knife. In addition, there is a tendency for forming rough edges or hanging of loose parts or substance on the slices. Unless the substance is supported adjacent the knife the edge will become frayed in a most unappetizing manner.

It is well known in the art that corrugations or raised ribs on the carriage or food table and perpendicular to the cutting knife will tend frictionally to inhibit transverse movement of the bottom of the article being sliced. The substance support, according to the present invention, tends to incline the material downwardly toward the plane of the knife until it comes into contact with the upwardly inclined corrugated portion of the carriage. This strains the substance into forceful engagement with the latter corrugations at a point immediately adjacent the contact with the knife. It will be readily apparent, however, that the effect of inclining the support for the substance, as well as the edge of the carriage, will produce longitudinal stresses and that vigorous application of the clamp will produce a moment of force longitudinally of the corrugations 52 and 54.

Moreover, sausages and the like commonly have end portions which are hemispherical in shape and, if this portion of the surface is clamped against the food table as the last portion of the sausage is being sliced, a moment of force is created tending to push the sausage along the table in a direction transverse to the plane of the knife. This action is likewise evident in the slicing of cylindrical substances which are sliced with their axes generally parallel to the plane of the knife. The cross corrugations 60 cut into the ridges 55, however, form sharp points which dig into the substance and prevent it from being pulled or pushed, with respect to the surface of the substance support, at right angles to the plane of the knife and particularly toward said plane. The present structure is accordingly extremely effective in the slicing of curved or cylindrical bodies and tends to maintain and to present the substance uniformly and continually in proper position for the production of uniform slices free from imperfections. Inasmuch as the grooves are positioned adjacent the end of the plate, their effect occurs most nearly adjacent that position where it is essential that the article being sliced be rigidly and properly supported.

The above described transverse grooves 60 also tend to overcome any tendency for a substance of circular cross-section to turn on its axis when clamped with its axis perpendicular to the plane of the knife, the generally straight upstanding edges 62 being normally maintained in frictional engagement with the substance through the action of the meat clamp, as aforesaid. In this manner these straight-sided, sharp-edged prongs will be pressed into the substance should the substance tend to rotate, while at the same time the prongs already in engagement with the lower surface thereof will tend frictionally to adhere thereto by forcefully engaging the lower surface of the substance against the upstanding faces 62. It is, therefore, possible to in effect clamp the lower face of the substance to the surface of the substance support and prevent disengagement or displacement in a direction transversely thereof.

The present invention is particularly adaptable to the slicing of a substance which is either circular or prismatic in cross-section. All forces tending to distort the article transversely, axially or rotatively will be effectually resisted by the adequate support provided.

The invention provides an efficient, economical slicing machine carriage and substance support which normally can be quickly disassembled and cleaned but will permit the cutting of accurate, uniform slices and effectually prevent unauthorized displacement of the substance with respect to its support.

It is thought that the invention and numerous of its attendant advantages will be understood from the foregoing description and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. A slicing machine comprising a rotatably mounted knife, a reciprocal carriage, a food table above the carriage having a relatively plane surface, means for feeding substance on the food table toward the cutting plane of the knife, corrugations on said food table raised above said plane surface, corrugations on said food table depressed below said plane surface and spaced from the raised corrugations, and corrugations transversely of said second named corrugations and intersecting the second named corrugations to provide sharp substance engaging prongs whereby to resist displacement of the substance longitudinally thereof.

2. A slicing machine comprising a rotatably mounted knife, a reciprocal carriage, a food table above the carriage having a relatively plane surface, means for feeding substance on the food table toward the cutting plane of the knife, corrugations on said food table raised above the plane thereof and arranged generally normal to the plane of the knife, corrugations on said food table depressed below the plane thereof and spaced from the raised corrugations and generally parallel thereto, and corrugations transversely of said depressed corrugations and intersecting the said depressed corrugations to provide sharp substance engaging prongs whereby to resist displacement of the substance.

3. A slicing machine comprising a rotatably mounted knife, a reciprocal carriage, a food table above the carriage having a generally plane surface, means for feeding substance on the food table toward the cutting plane of the knife, grooves in the surface of said food table and extending generally perpendicular to the plane of the knife, and grooves formed transversely of said first named grooves to resist displacement of the substance on said table in a direction longitudinally of said first named grooves, said transversely extending grooves providing prongs positioned below the surface of the food table and having their extremities substantially flush with said surface.

4. A slicing machine comprising a rotatably mounted knife, a reciprocal carriage, a food table above the carriage, means for feeding substance on the food table toward the cutting plane of the knife, a plurality of upstanding ridges formed in said table and extending in a direction generally perpendicular to the plane of said knife, said ridges being lower at a point adjacent the knife than at a predetermined point removed from the plane of said knife whereby to incline substance placed thereon in a direction downwardly toward the plane of the knife, said table being formed with grooves transversely of said ridges and intersecting said ridges to provide substance engaging prongs to resist displacement of the substance on the table longitudinally thereof.

5. A slicing machine comprising a rotatably mounted knife, a reciprocal carriage, a food table above the carriage, means for feeding substance on the food table toward the cutting plane of the knife, a substance supporting face on said food table comprising a plurality of upstanding ridges having grooves therebetween and extending in a direction generally perpendicular to the plane of the knife, a second group of upstanding ridges generally parallel to said first group of ridges and removed rearwardly therefrom with respect to the plane of the knife, said second group of ridges being elevated vertically above the plane of said first group, there being grooves formed in said substance supporting face transversely of said second named ridges and intersecting said ridges to provide sharp prongs to resist displacement of substance.

6. In a slicing machine comprising a rotatably mounted knife, a reciprocal carriage, a food table above the carriage, means for feeding substance on the food table toward the cutting plane of the knife, a substance supporting face on said food table adjacent the knife, a second substance supporting face on the food table removed from the plane of the knife, said second supporting face being arranged in a plane parallel to the plane of said first named supporting face and being elevated above the plane of said first supporting face whereby substance placed thereon will incline downwardly toward the plane of said knife, a portion only of the transverse width of said food table being provided with grooves in two directions and forming prongs to engage said substance and resist displacement thereof, a portion of said transverse width being substantially free of prongs whereby to permit selective positioning of the substance.

7. A slicing machine comprising a rotatably mounted knife, a reciprocal carriage, a food table above the carriage, means for feeding substance on the food table toward the cutting plane of the knife, grooves in the surface of said food table and extending generally perpendicular to the plane of the knife, and grooves formed transversely of said first named grooves, said transverse grooves having one generally perpendicular side whereby to frictionally engage the bottom surface of substance placed thereon to resist frictional displacement.

8. A slicing machine comprising a rotatably mounted knife, a reciprocal carriage, a food table above the carriage inclined downwardly toward the cutting plane of the knife, means for feeding substance on the food table toward the cutting plane of the knife, grooves in the surface of said food table and extending generally perpendicular to the plane of the knife, and grooves formed transversely of said first named grooves, each groove having a substantially vertical side adjacent the knife whereby to frictionally engage the bottom surface of substance placed thereon to resist frictional displacement.

9. A slicing machine comprising a food support provided with ridges and furrows extending in a predetermined direction, the ridges having gradual sloping sides extending downwardly from the crests thereof, said support having the ridges milled out to provide transverse furrows the same depth as the longitudinal furrows to provide transverse ridges, said transverse ridges having one side relatively straight and the other side relatively gradually inclined.

10. A slicing machine comprising a food support provided with longitudinal ridges and furrows, the ridges having gradual sloping sides extending downwardly from the crests thereof, said support also having transverse ridges and furrows intersecting the first named ridges and furrows, said last named ridges having one side relatively straight and a gradual sloping other side.

11. A slicing machine comprising a food table having a plane surface provided with alternate ridges and furrows formed therein, the ridges being substantially the same elevation as the surface, there being other ridges and furrows extending transversely of the first ridges and furrows, the second ridges and furrows being at substantially the same elevation as the first ridges and furrows.

12. A slicing machine comprising a food table having a plane surface provided with alternate ridges and furrows formed therein, the ridges being substantially the same elevation as the surface, there being other ridges and furrows extending transversely of the first ridges and furrows, the second ridges and furrows being at substantially the same elevation as the first ridges and furrows, said first ridges having gradual inclined surfaces extending downwardly from both sides of their crests, the second named ridges having a relatively straight surface on one side of the crest and a gradual sloping surface on the other side of the crest.

RICHARD J. HEUER.